United States Patent
Kleinschmit et al.

[11] Patent Number: 5,971,412
[45] Date of Patent: Oct. 26, 1999

[54] SUPPORT FRAME FOR CONNECTING THE WHEEL SUPPORT ELEMENTS OF A VEHICLE TO A VEHICLE BODY

[75] Inventors: Einhard Kleinschmit, Esslingen; Harald Reimold, Eppingen; Peter Tattermusch, Esslingen, all of Germany

[73] Assignee: Daimler Chryler A.G., Stuttgart, Germany

[21] Appl. No.: 08/871,726

[22] Filed: Jun. 9, 1997

[30] Foreign Application Priority Data

Jun. 15, 1996 [DE] Germany ............... 196 23 997

[51] Int. Cl.⁶ .................................................. B62D 5/00
[52] U.S. Cl. ................................. 280/124.109; 280/788
[58] Field of Search ................... 280/124.109, 124.103, 280/788.4; 180/312

[56] References Cited

U.S. PATENT DOCUMENTS

| | | | |
|---|---|---|---|
| 3,362,498 | 1/1968 | Allison | 180/360 |
| 3,441,289 | 4/1969 | Frantz et al. | 280/124.109 |
| 3,729,210 | 4/1973 | Cummingham, Jr. | 280/124.109 |
| 3,913,696 | 10/1975 | Kennedy et al. | 180/312 |
| 4,826,203 | 5/1989 | Kijima et al. | 280/124.109 |
| 4,943,092 | 7/1990 | Haraguchi | 280/124.109 |
| 4,964,651 | 10/1990 | Kubo | 280/124.1 |
| 5,005,849 | 4/1991 | Gandiglio et al. | 280/124.109 |
| 5,560,651 | 10/1996 | Kami et al. | 280/788 |
| 5,833,026 | 11/1998 | Zetterstrom et al. | 180/360 |

FOREIGN PATENT DOCUMENTS

| | | |
|---|---|---|
| 0 324 663 | 7/1989 | European Pat. Off. . |
| 0 496 949 | 8/1992 | European Pat. Off. . |
| 63 287616 | 11/1988 | Japan . |
| 05 008648 | 1/1993 | Japan . |
| 06 286642 | 10/1994 | Japan . |
| 08 080866 | 3/1996 | Japan . |

*Primary Examiner*—Christopher P. Ellis
*Attorney, Agent, or Firm*—Klaus J. Bach

[57] ABSTRACT

In a wheel support frame for connecting wheel support elements of a vehicle to a vehicle body with two longitudinal frame members extending parallel to the longitudinal vehicle axis and two transverse frame members being connected to the longitudinal frame members, at least one of the transverse frame members is connected to the longitudinal frame members by elastic mounts and also the longitudinal frame members which support the wheels are connected to the vehicle body by elastic mounts.

4 Claims, 2 Drawing Sheets

SUPPORT FRAME FOR CONNECTING THE WHEEL SUPPORT ELEMENTS OF A VEHICLE TO A VEHICLE BODY

BACKGROUND OF THE INVENTION

The invention relates to a support frame for mounting the wheel support elements of a vehicle to the vehicle body including two spaced longitudinal frame members extending in spaced relationship parallel to the longitudinal axis of the vehicle and two transverse frame members. Such a wheel support frame may be provided particularly for the driven rear wheels of a vehicle and may support the rear wheel drive housing.

It is the object of the present invention to provide a support frame for mounting the wheel support elements to a vehicle body which has a positive effect on the inherent steering characteristics of the wheels mounted to the support frame.

SUMMARY OF THE INVENTION

In a support frame for connecting wheel support elements of a vehicle to a vehicle body with two longitudinal frame members extending parallel to the longitudinal vehicle axis and two transverse frame members being connected to the longitudinal frame members, at least one of the transverse frame members is connected to the longitudinal frame members by elastic mounts and also the longitudinal frame members which support the wheels are connected to the vehicle body by elastic mounts.

The invention is based on the concept to transmit forces effective on the wheels during vehicle operation in such a way to the vehicle wheel support frame that the longitudinal frame members are subject to a well defined inherent movement. Such inherent movement is possible on one hand because of the elastic connection of the wheel support frame with the vehicle body and, on the other hand, by the at least partial elastic interconnection between the longitudinal and the transverse frame members of the wheel support frame.

If, for example, a rear wheel support frame supporting a rear wheel drive housing has a rear transverse frame member which is rigidly connected to the longitudinal frame members and a front transverse member which is elastically connected to the two longitudinal frame members, the arrangement provides for understeer characteristics of the vehicle during cornering because of the side forces transmitted by the wheels to the longitudinal frame members.

In order to achieve such handling characteristics with a front wheel support frame the connection of the front and rear transverse frame members to the longitudinal frame members must be reversed. That is, the front transverse frame member is rigidly connected to the longitudinal frame members and the rear transverse frame member is elastically connected to the longitudinal frame members.

In an embodiment of the invention, both, the front as well as the rear transverse frame members are elastically connected to the longitudinal frame members of the wheel support frame. With such an arrangement forces effective on the wheels during vehicle operation in a direction of the vertical vehicle axis and the longitudinal vehicle plane including the longitudinal vehicle axis do not affect the vehicle in a negative way since, as a result of the elastic resiliency within the wheel support frame, a twisting of the vehicle wheels about a vertical vehicle axis as a result of the forces transmitted to the vehicle wheels is avoided. Each longitudinal frame member can be moved slightly relative and parallel to the longitudinal vehicle axis because the longitudinal frame members are resiliently connected to the transverse frame members. This improves the driving comfort of the vehicle when side forces which are not generated by cornering are effective on the wheels and provides for a certain uncoupling between the longitudinal and transverse frame members achieved by the elastic connections.

The elastic mounts between the transverse and the longitudinal frame members and between the longitudinal frame members and the vehicle body may have different elasticities in the longitudinal and transverse directions. Specifically, the elasticity in the longitudinal vehicle direction may be greater than that in transverse direction.

With the arrangement vibrations which originate for example in an axle gear structure or a CV-jointed drive shaft which have to be absorbed by the vehicle body are greatly dampened. Also, on effective suppression of acoustic and vibrational uncoupling between the left and the right half of the vehicle axle can be achieved.

With an elastic mounting of the transverse frame members on the longitudinal frame members of the support frame the wheel drive housing can be mounted on the transverse frame members in an at least partially rigid manner.

The longitudinal and transverse frame members may consist of different materials; particularly the two transverse frame members may consist of different materials.

Because of the separability of the transverse frame members and the longitudinal frame members the wheel drive unit can be easily mounted by first mounting at least one transverse frame member to the wheel drive unit and then mounting the transverse member or members with the wheel drive unit to the longitudinal frame members. The longitudinal frame members may be firmly mounted to the vehicle body and may remain firmly mounted when the wheel drive unit is removed from the vehicle body.

With the same longitudinal and transverse frame members different relative arrangements of the wheel drive unit on the wheel support frame may be provided so that there is no need for storing different pre-manufactured wheel mounting frames for different vehicles. The different arrangements can be obtained by different rubber mounts and/or correspondingly formed transverse and/or longitudinal frame members.

The invention will be described in greater detail with reference to the rear axle of a vehicle on the basis of the schematic drawings representing top views of the wheel support frame.

DESCRIPTION OF PREFERRED EMBODIMENTS

A wheel support frame to be mounted on a vehicle body (not shown) by means of elastic mounts 1 consists of a pair of longitudinal frame members 2 and a pair of transverse frame members 3. The longitudinal and transverse frame members are interconnected by elastic mounts 4 in a rectangular arrangement.

Figure 1:
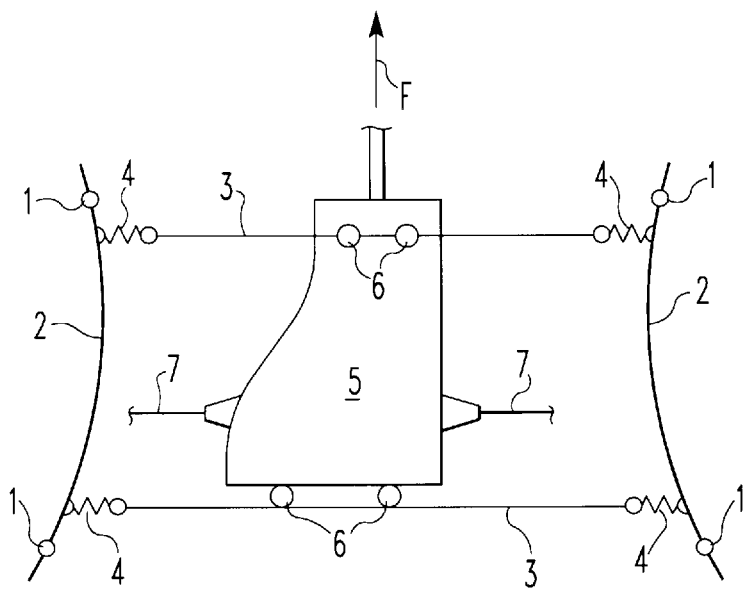
FIG. 1 shows a wheel support frame with a rear wheel drive unit mounted thereon and transverse frame members elastically mounted on longitudinal frame members.

In FIG. 1, the driving direction of the vehicle on which the wheel support frame is mounted in the area of the rear axle is indicated by an arrow F.

In the embodiment shown in FIG. 1, a wheel drive unit 5 is mounted on the transverse frame members 3 by way of mounts 6. These mounts 6 may be rigid or elastic.

From the wheel drive unit 5 drive shafts 7 extend for driving the rear vehicle wheels which are to be mounted on the axle of the wheel drive unit 5. The links for supporting the wheels are connected to the longitudinal frame members 2. Consequently, forces effective on the wheels during driving are transmitted to the longitudinal frame members 2 which can move slightly relative to the vehicle body and relative to the transverse frame members 3 because of the elastic mounts by which the longitudinal frame members are connected to the vehicle body and to the transverse frame members 3. In this way, the behavior of the vehicle wheels, especially their steering characteristics, can be influenced by the forces effective during vehicle operation with a view to improving the vehicle driving comfort, particularly the handling of the vehicle.

Figure 2:
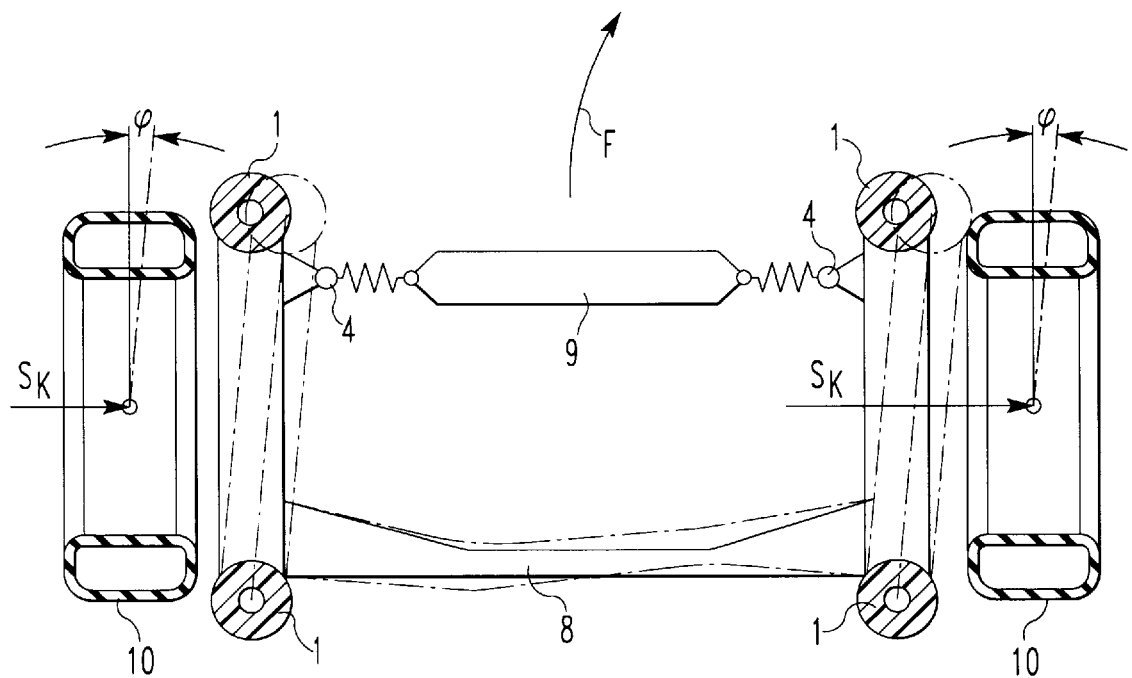
FIG. 2 shows a wheel support frame with a rear transverse frame member rigidly connected to the longitudinal frame members and a front transverse frame member elastically mounted to the longitudinal frame members with some deformation indicated as it may be generated by cornering.
Figure 3:
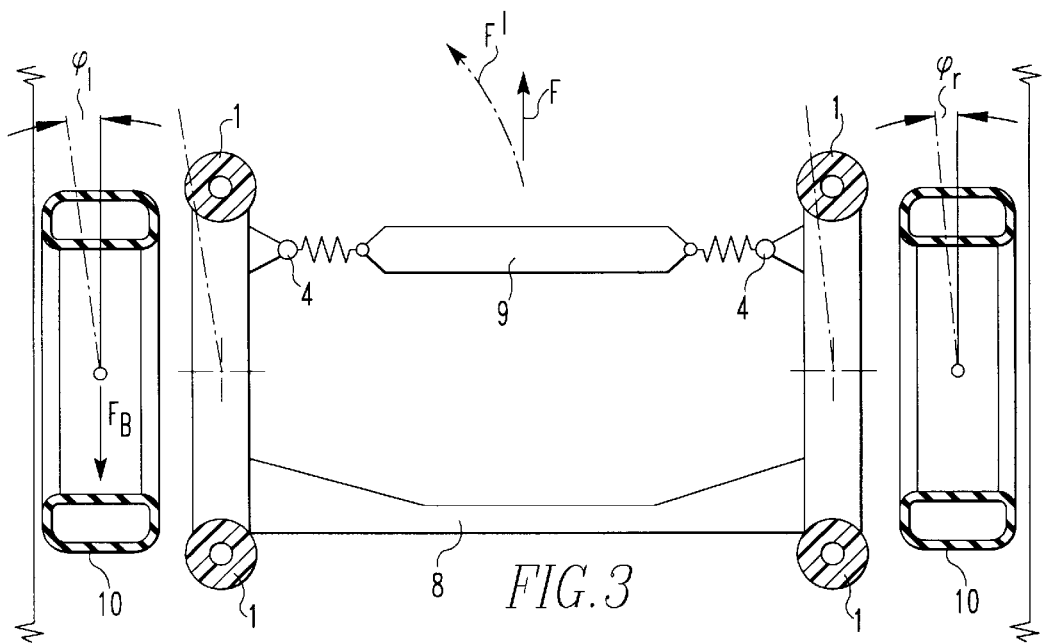
FIG. 3 shows a wheel support frame according to FIG. 2 indicating deformation under various braking forces effective on the two wheels linked thereto.
Figure 4:
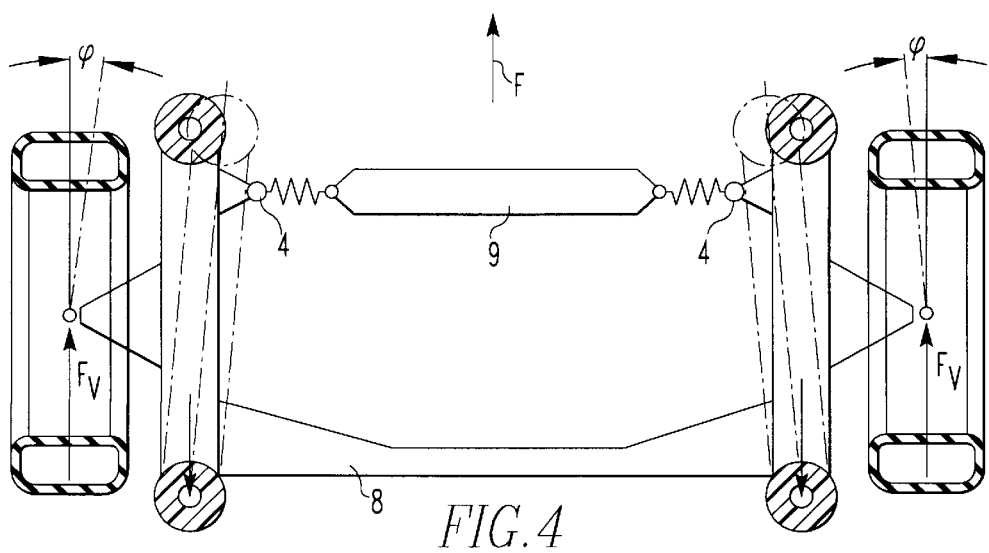
FIG. 4 shows a wheel support frame according to FIG. 2 indicating a deformation as a result of the drive forces of the wheels linked thereto.

In the support frame arrangements as shown in FIGS. 2 to 4 all of which relate to rear wheel drives the rear transverse frame member 8 is rigidly connected to the longitudinal frame members 2 and the front transverse frame member 9 is elastically connected to the longitudinal frame members 2.

FIG. 2 shows the mounting frame deformed by the side forces $S_k$ effective on the wheels 10 during cornering of the vehicle driving in the direction F. The deformation is indicated by dash-dotted lines. For the wheels 10, the deformation of the mounting frame results in a turning of the wheels 10 by the angles $\phi$ providing for an understeer effect.

In the embodiment of FIG. 3, different braking forces are effective on the two wheels 10 of the rear axle for example by different adhesion of the two wheels 10 on the road surface. With a braking force effective on the left wheel 10 as shown in the figure which is greater than the braking force effective on the right wheel 10 there is a directional deviation in the direction of the dash-dotted arrow F'. Since the braking force effective on the left wheel 10 is greater, the left wheel is turned to a greater degree than the right wheel because of the wheel mounting frame deformation generated by the braking force, that is, the turning angle $\phi_e$ is greater than the angle $\phi_r$. As a result, the left wheel 10 assumes a toe-out position with regard to the direction change F' occurring with the braking and consequently provides a steering effect in the direction of a course correction toward the original direction F. With the wheel mounting frame deformation, an advantageous course correcting self-steering behavior of the rear axle can be achieved in this manner.

As shown in FIG. 4 the wheel support frame is subjected to equal wheel driving forces of the two drive wheels 10. The forces $F_v$ generated by the drive wheels 10 provide for a deformation of the wheel support frame which increases the toe-in positioning by an angle $\phi$ at both wheels. This change of the wheel alignment is superimposed on the wheel guide changes effective between the wheels and the axle support structure which is not shown.

What is claimed is:

1. A wheel support frame for connecting wheel support elements of a vehicle having a longitudinal axis to a vehicle body, comprising: two longitudinal frame members extending in spaced relationship essentially parallel to said longitudinal vehicle axis and two transverse frame members connected to said longitudinal frame members, at least one of said transverse frame members being connected to said longitudinal frame members by elastic mounts, said wheel support frame including elastic mounts for mounting said wheel support frame to the vehicle body, said longitudinal frame members supporting the wheels of said vehicle.

2. A wheel support frame according to claim 1, wherein both said transverse frame members are connected to said longitudinal frame members by elastic mounts.

3. A wheel support frame according to claim 1, wherein said elastic mounts interconnecting said transverse frame members and said longitudinal frame members have different elasticities in a longitudinal and in a transverse direction.

4. A wheel support frame according to claim 3, wherein the elasticity of said elastic mounts in the longitudinal direction of said vehicle is greater than that in the transverse direction.

* * * * *